United States Patent
Yamaguchi et al.

(10) Patent No.: US 11,749,231 B2
(45) Date of Patent: Sep. 5, 2023

(54) DEVICE AND METHOD FOR FOVEATED RENDERING

(71) Applicant: Synaptics Incorporated, San Jose, CA (US)

(72) Inventors: Satoshi Yamaguchi, Tokyo (JP); Kota Kitamura, Tokyo (JP); Takashi Nose, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 45 days.

(21) Appl. No.: 17/393,557

(22) Filed: Aug. 4, 2021

(65) Prior Publication Data

US 2023/0038469 A1 Feb. 9, 2023

(51) Int. Cl.
*G09G 5/377* (2006.01)
*G02B 27/01* (2006.01)

(52) U.S. Cl.
CPC ........... *G09G 5/377* (2013.01); *G02B 27/017* (2013.01); *G09G 2340/0407* (2013.01)

(58) Field of Classification Search
CPC .................. G09G 5/377; G09G 2340/0407
See application file for complete search history.

(56) References Cited

U.S. PATENT DOCUMENTS

| | | | |
|---|---|---|---|
| 2017/0236466 A1* | 8/2017 | Spitzer | G09G 3/2085 345/560 |
| 2018/0136720 A1* | 5/2018 | Spitzer | G06T 3/40 |
| 2019/0013826 A1* | 1/2019 | Kikuta | H04N 19/89 |
| 2019/0043167 A1* | 2/2019 | Steyskal | G06T 3/4038 |
| 2019/0122642 A1* | 4/2019 | Morein | G09G 5/006 |
| 2020/0145607 A1* | 5/2020 | Zhang | H04N 7/0117 |

* cited by examiner

*Primary Examiner* — Terrell M Robinson
(74) *Attorney, Agent, or Firm* — Leydig, Voit & Mayer, Ltd.

(57) ABSTRACT

A display driver includes image processing circuitry and drive circuitry. The image processing circuitry is configured to receive a foveal image, a full frame image, and coordinate data that specifies a position of the foveal image in the full frame image. The image processing circuitry is further configured to render a resulting image based on the full frame image independently of the foveal image in response to detection of a data error within the coordinate data. The drive circuitry is configured to drive a display panel based on the resulting image.

20 Claims, 7 Drawing Sheets

| VS | VBP | | | |
|---|---|---|---|---|
| HS | ⋮ | | | |
| HS | ⋮ | | | |
| HS | ⋮ | | | |
| HS | VBP | | | |
| HS | HBP | Foveal Image #1 | | HFP |
| HS | HBP | Foveal Image #2 | | HFP |
| HS | HBP | ⋮ | | HFP |
| HS | HBP | ⋮ | | HFP |
| HS | HBP | ⋮ | | HFP |
| HS | HBP | ⋮ | | HFP |
| HS | HBP | ⋮ | | HFP |
| HS | HBP | Foveal Image #M-1 | | HFP |
| HS | HBP | Foveal Image #M | | HFP |
| HS | HBP | Coordinate | Full Frame Image #1 | HFP |
| HS | HBP | Data | Full Frame Image #2 | HFP |
| HS | HBP | ⋮ | | HFP |
| HS | HBP | ⋮ | | HFP |
| HS | HBP | ⋮ | | HFP |
| HS | HBP | ⋮ | | HFP |
| HS | HBP | ⋮ | | HFP |
| HS | HBP | ⋮ | | HFP |
| HS | HBP | Full Frame Image #M-1 | | HFP |
| HS | HBP | Full Frame Image #M | | HFP |
| HS | VFP | | | |
| HS | ⋮ | | | |
| HS | VFP | | | |

FIG. 4B

| VS | VBP | | | | |
|---|---|---|---|---|---|
| HS | ⋮ | | | | |
| HS | ⋮ | | | | |
| HS | ⋮ | | | | |
| HS | VBP | | | | |
| HS | HBP | Foveal Image #1 | | | HFP |
| HS | HBP | Foveal Image #2 | | | HFP |
| HS | HBP | ⋮ | | | HFP |
| HS | HBP | ⋮ | | | HFP |
| HS | HBP | ⋮ | | | HFP |
| HS | HBP | ⋮ | | | HFP |
| HS | HBP | ⋮ | | | HFP |
| HS | HBP | Foveal Image #M-1 | | | HFP |
| HS | HBP | Foveal Image #M | | | HFP |
| HS | HBP | Coordinate Data | Full Frame Image #1 | Coordinate Data | HFP |
| HS | HBP | | Full Frame Image #2 | | HFP |
| HS | HBP | | ⋮ | | HFP |
| HS | HBP | | | | HFP |
| HS | HBP | | | | HFP |
| HS | HBP | | | | HFP |
| HS | HBP | | | | HFP |
| HS | HBP | | | | HFP |
| HS | HBP | Full Frame Image #M-1 | | | HFP |
| HS | HBP | Full Frame Image #M | | | HFP |
| HS | VFP | | | | |
| HS | ⋮ | | | | |
| HS | VFP | | | | |

DEVICE AND METHOD FOR FOVEATED RENDERING

FIELD

The disclosed technology generally relates to devices and methods for foveated rendering.

BACKGROUND

Foveated rendering is a technology to render a "foveated image" that may include a foveal region corresponding to the foveal vision of the human and a peripheral region corresponding to the peripheral vision. To simulate the human's vision, foveated rendering may be achieved by merging or overlaying a foveal image with increased fineness (or resolution) with a full frame image with reduced fineness.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, a display driver is provided. The display driver includes image processing circuitry and drive circuitry. The image processing circuitry is configured to receive a foveal image, a full frame image, and coordinate data that specifies a position of the foveal image in the full frame image. The image processing circuitry is further configured to render a resulting image based on the full frame image independently of the foveal image in response to detection of a data error within the coordinate data. The drive circuitry is configured to drive a display panel based on the resulting image.

In one or more embodiments, a display system is provided. The display system includes a display panel and a display driver. The display driver is configured to receive a foveal image, a full frame image, and coordinate data that specifies a position of the foveal image in the full frame image. The display driver is further configured to render a resulting image based on the full frame image independently of the foveal image in response to detection of a data error within the coordinate data. The display driver is further configured to drive a display panel based on the resulting image.

In one or more embodiments, a method for driving a display panel is provided. The method includes receiving a foveal image, a full frame image, and coordinate data that specifies a position of the foveal image in the full frame image. The method further includes rendering a resulting image based on the full frame image independently of the foveal image in response to detection of a data error within coordinate data. The method further includes driving a display panel based on the resulting image.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description. The term "coupled" as used herein means connected directly to or connected through one or more intervening components or circuits.

Foveated rendering is a technology to render a "foveated image" which may include a foveal region corresponding to the foveal vision of the human and a peripheral region corresponding to the peripheral vision. Foveated image rendering is widely used in head mounted display (HMD) systems (e.g., virtual reality (VR) systems) to improve user experience with reduced hardware.

One approach to achieve foveated rendering is to merge or overlaying a foveal image with a full frame image. The foveal image may correspond to the foveal vision of the user, and the full frame image may correspond to the full field-of-view of the user. To simulate the human's vision, the foveal image may include more visual information (or details) per unit area than the full frame image. The position of the foveal image in the full frame image may be determined based on the gaze direction of the user, which may be detected through eye tracking.

A display driver (e.g., a display driver integrated circuit (DDIC)) configured to drive a display panel in an HMD system may be adapted to foveated rendering. In such cases, the display driver may be configured to receive a foveal image and a full frame image from a controller external to the display driver and merge the foveal image with the full frame image.

In various implementations, the controller may be configured to generate coordinate data. The coordinate data specifies the position of the foveal image in the full frame image. The external controller further sends the coordinate data to the display driver. The coordinate data may be generated based on the gaze direction of the user detected through eye tracking. The display driver may be configured to merge the foveal image with the full frame image such that the foveal image is positioned in the full frame image at the position specified by the coordinate data.

One issue may be occurrence of a data error within the coordinate data. Possible causes of the data error may include electromagnetic interference (EMI) or noise applied to the display driver and/or the communication link between the display driver and the external controller, soft errors in the display driver and/or the external controller, and malfunction of the display driver and/or the external controller. The data error within the coordinate data may cause a severe corruption of the foveated image generated through foveated rendering. The present disclosure provides various approaches to avoid the corrupted foveated image being displayed on the display panel.

In one or more embodiments, a display driver includes image processing circuitry and drive circuitry. The image processing circuitry is configured to receive a foveal image, a full frame image, and coordinate data that specifies a position of the foveal image in the full frame image. The image processing circuitry is further configured to render a resulting image based on the full frame image independently of the foveal image in response to detection of a data error within the coordinate data. Rendering the resulting image based on the full frame image independently of the foveal image may include using the full frame image as the resulting image or generating the resulting image through applying an image process (e.g., upscaling) to the full frame image without referring to the foveal image. The drive circuitry is configured to drive a display panel based on the resulting image. Various embodiments of the present disclosure will be described in detail in the following.

Figure 1:
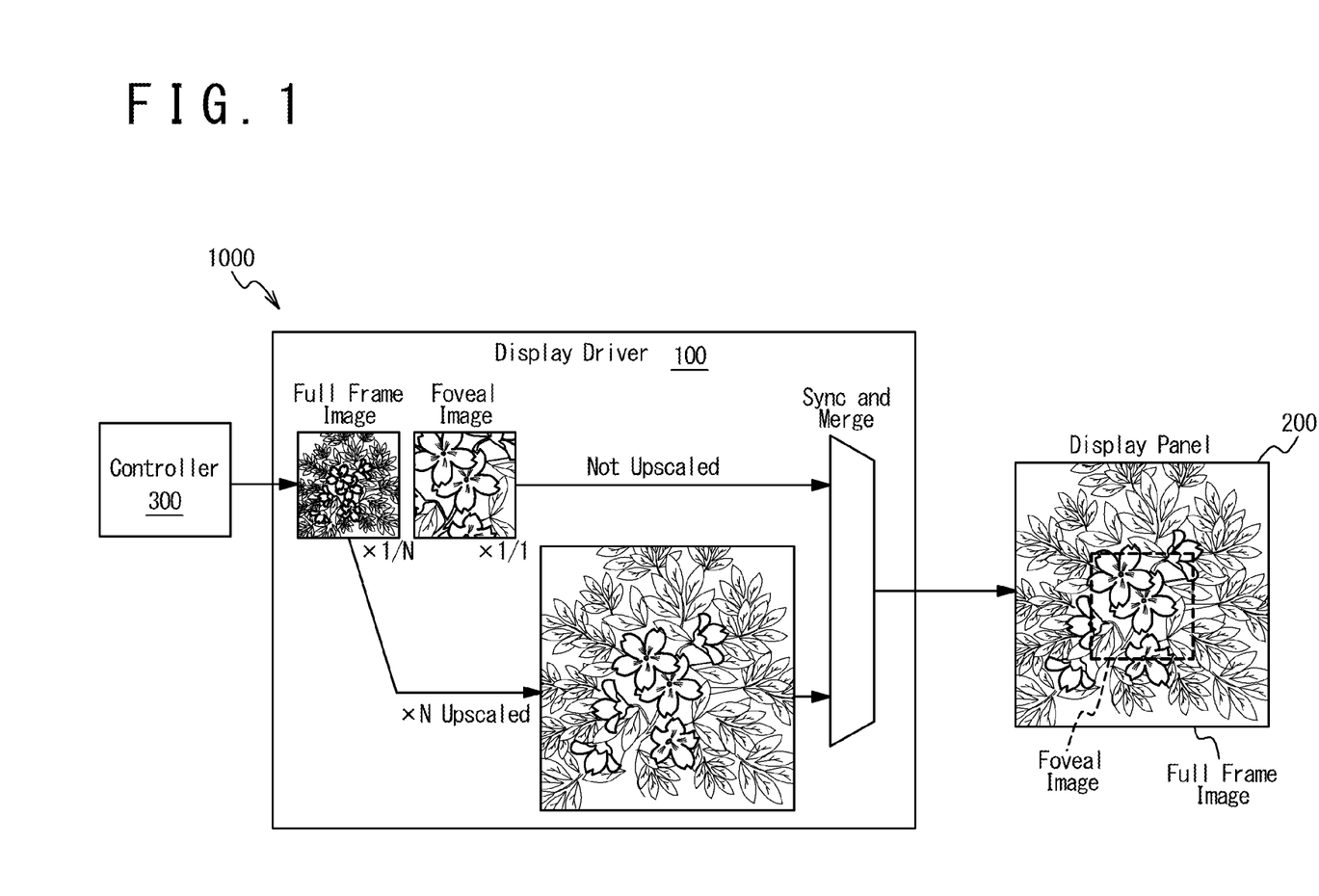
FIG. 1 illustrates an example configuration of a display system, according to one or more embodiments.

FIG. 1 illustrates an example configuration of a display system 1000, according to one or more embodiments. The display system 1000 may be configured as a head mount display (HMD) system, such as a virtual reality (VR) system. In the illustrated embodiment, the display system 1000 includes a display driver 100, a display panel 200, and a controller 300. The display panel 200 may be a liquid crystal display (LCD) panel, an organic light emitting diode (OLED) display panel, or other suitable display panels.

In the illustrated embodiment, the controller 300 is configured to send a foveal image and a full frame image to the display driver 100. The foveal image may correspond to a foveal vision of the user, and the full frame image may correspond to a full field-of-view of the user. In one or more embodiments, the full frame image may have the same resolution as the foveal image but encompass a larger display area. In other embodiments, the full frame image may have a different resolution from the resolution of the foveal image. The display driver 100 is configured to render a resulting image based on the foveal image and the full frame image and drive the display panel 200 based on the resulting image. The resulting image may be a foveated image in which the foveal image is overlayed in the full frame image. In some implementations, the display driver 100 may be configured to display the resulting image on the display panel 200. In other implementations, the display driver 100 may be further configured to apply image processing to the resulting image and display the image acquired by the image processing on the display panel 200.

In various embodiments, the display driver 100 is configured to upscale the full frame image received from the controller 300 and merge the foveal image with the upscaled full frame image to generate the resulting image. In one implementation, the upscaled full frame image may be N times as large as the original full frame image received from the controller 300, where N is an upscale factor more than one. The upscale factor N may be a natural number of two or more. In some implementations, the foveal image and the original full frame image has the same number of pixels, and the upscaled full frame image may include $N^2$ times as many pixels as the original full frame image (and the foveal image). In this case, the portion of the resulting image other than the foveal image has less visual information per unit area than the foveal image, effectively simulating the peripheral vision.

Figure 2A:
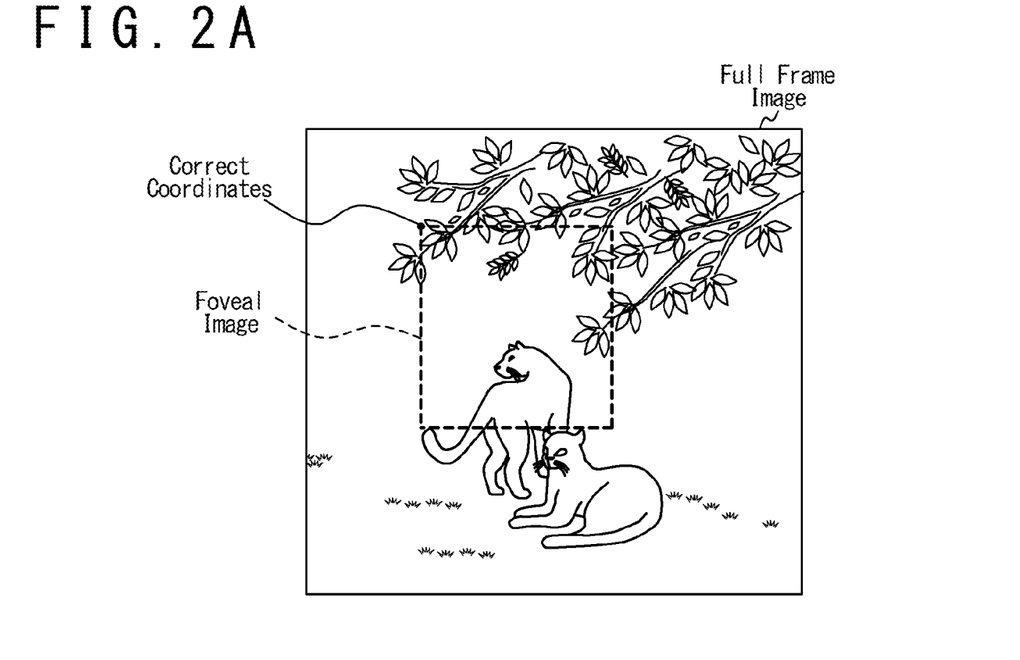
FIG. 2A illustrates an example resulting image in which a foveal image is merged with a full frame image at the position specified by the coordinate data, according to one or more embodiments.

In one or more embodiments, the controller 300 is further configured to send coordinate data to the display driver 100, the coordinate data specifying the position of the foveal image in the full frame image. In such embodiments, the display driver 100 is configured to render the resulting image such that the foveal image is positioned in the upscaled full frame image at the position specified by the coordinate data. The coordinate data may indicate coordinates of a specific pixel of the foveal image (e.g., the left top corner pixel) in the full frame image or the upscaled full frame image. FIG. 2A illustrates an example resulting image in which the foveal image is merged at the position (or coordinates) specified by the coordinate data, according to one or more embodiments.

Figure 2B:
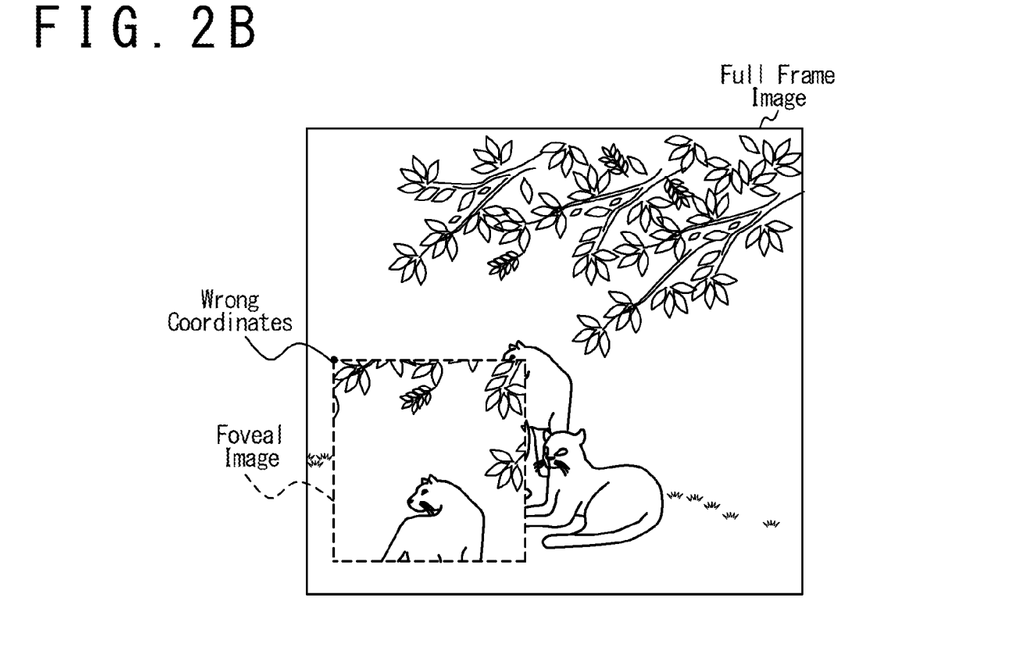
FIG. 2B illustrates an example corruption of a resulting image in foveated rendering.

One issue with the display system 1000 illustrated in FIG. 1 may be a data error within the coordinate data. Possible causes of the data error may include electromagnetic interference (EMI) or noise applied to the display driver 100 and/or the communication link between the display driver 100 and the controller 300, soft errors in the display driver 100 and/or the controller 300, and malfunction of the display driver 100 and/or the controller 300. The data error within the coordinate data may cause a severe corruption of the resulting image. FIG. 2B illustrates an example corruption of the resulting image. The data error within the coordinate data may result in that the foveal image is merged with the upscaled full frame image at a wrong position, causing inconsistency of the resulting image.

To mitigate or avoid the corruption of the resulting image displayed on the display panel 200, in one or more embodiments, the display driver 100 is configured to generate the resulting image based on the full frame image independently of the foveal image in response to detection of a data error within the coordinate data. In various implementations, the display driver 100 may be configured to output the upscaled full frame image as the resulting image in response to detection of a data error within the coordinate data, without merging the foveal image with the upscaled full frame image. The display driver 100 may be further configured to, in response to no detection of a data error within the coordinate data, render a foveated image by merging the foveal image with the upscaled full frame image and output the foveated image as the resulting image. In such implementations, the resulting image may be either the foveated image or the upscaled full frame image. In the following, a description is given of example embodiments of the display driver 100 thus configured.

Figure 3A:
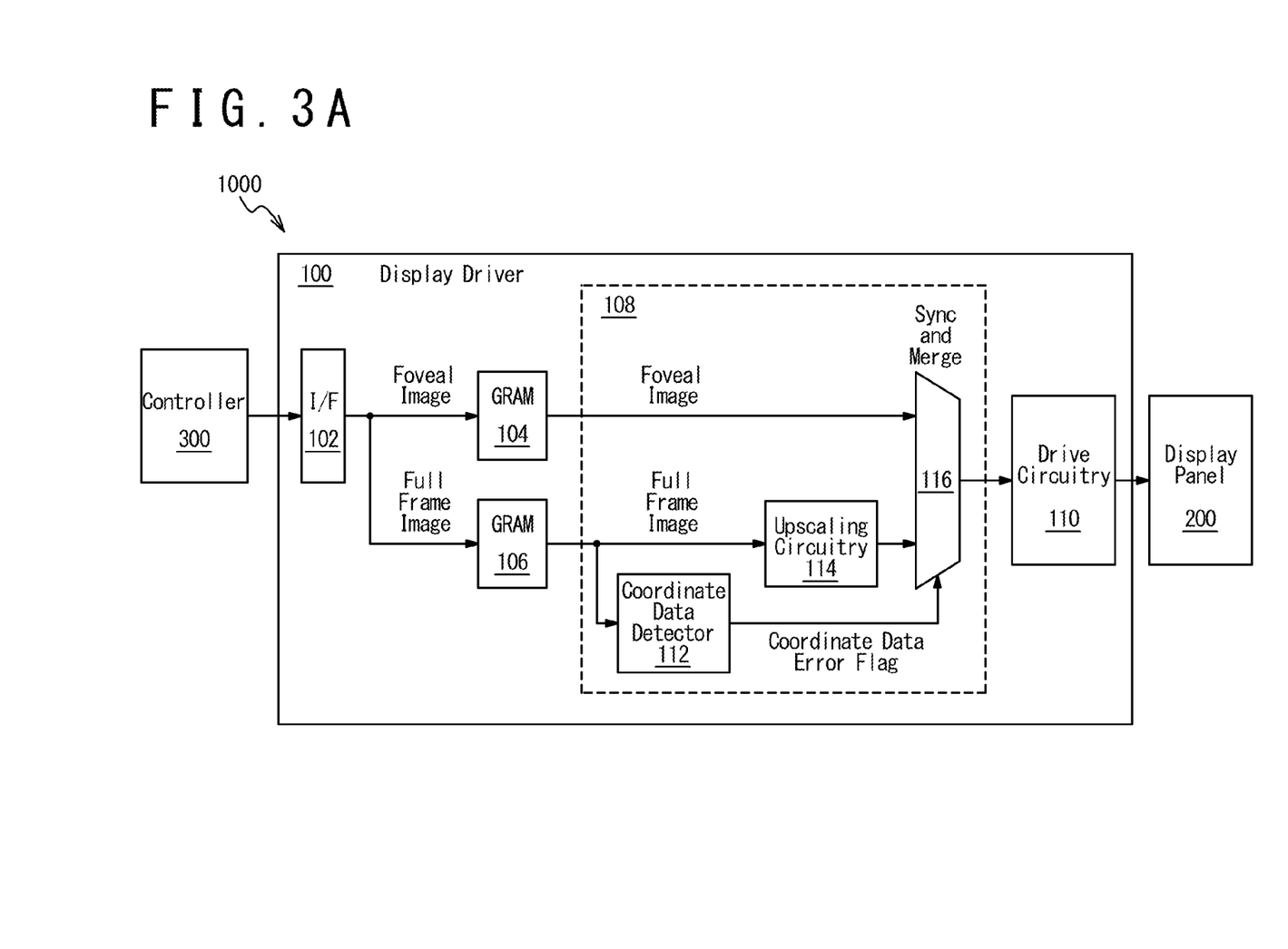
FIG. 3A illustrates an example configuration of a display driver, according to one or more embodiments.

FIG. 3A illustrates an example configuration of the display driver 100, according to one or more embodiments. In the illustrated embodiment, the display driver 100 includes interface circuitry 102, graphic random access memories (GRAMs) 104, 106, image processing circuitry 108, and drive circuitry 110.

The interface circuitry 102 is configured to receive a foveal image and a full frame image from the controller 300. The foveal image and the full frame image may be transmitted to the interface circuitry 102 in the form of image data that include pixel data for respective pixels. The interface circuitry 102 is further configured to receive coordinate data from the controller 300, the coordinate data specifying the position of the foveal image in the full frame image.

Figure 4A:
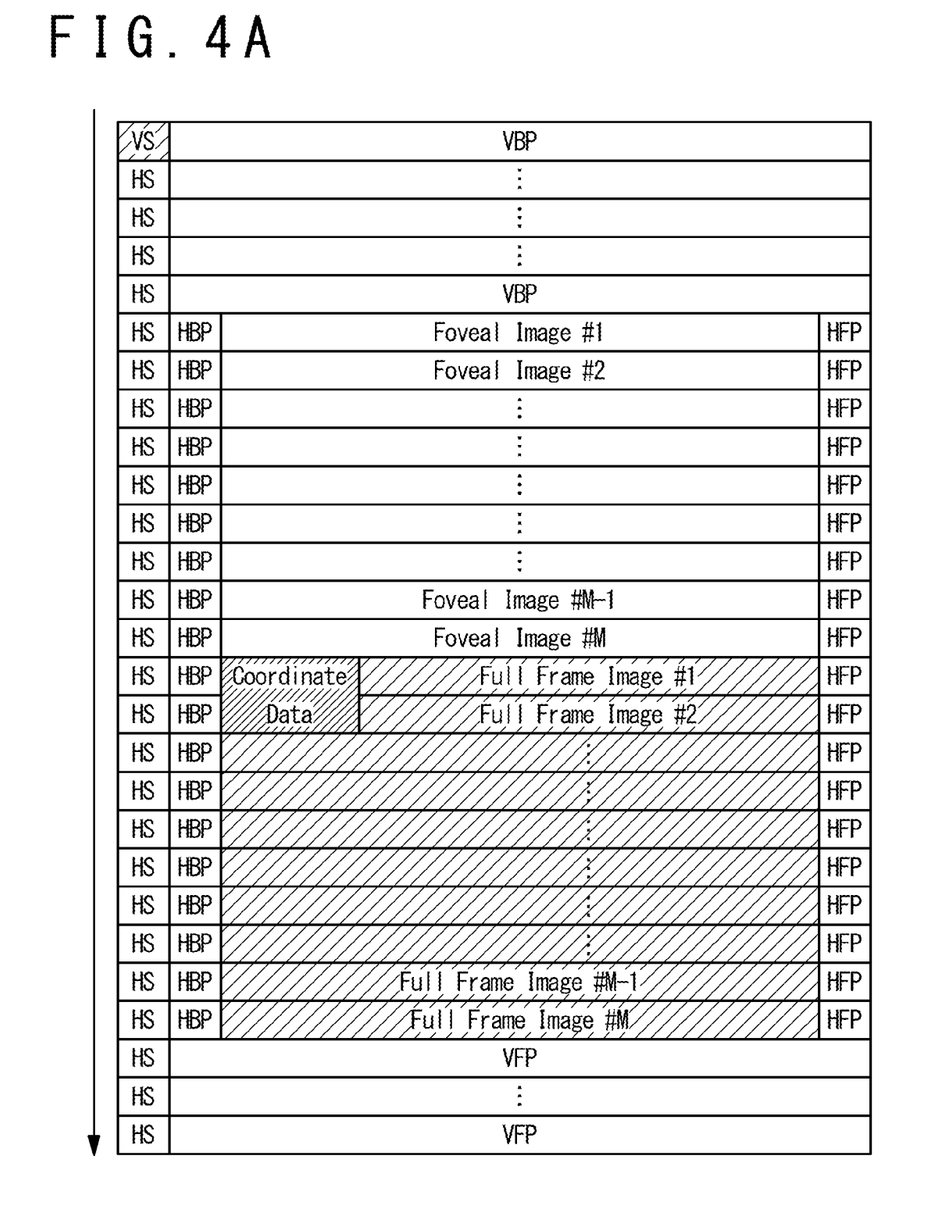
FIG. 4A illustrates an example data format of image data transmitted from a controller to a display driver during one frame period, according to one or more embodiments.

FIG. 4A illustrate an example data format of the image data transmitted from the controller 300 to the display driver 100 during one frame period, according to one or more embodiments. In FIG. 4A, each row indicate data transmitted to the during one horizontal period. "VS" designates a vertical sync packet that indicates a start of the frame period, and "HS" designates a horizontal sync packet that indicate a start of a horizontal sync period. "VBP" designates a vertical back porch, "VFP" designates a vertical front porch, "HBP" designates a horizontal back porch, and "HFP" designates a horizontal front porch. "Foveal Image #1" to "Foveal Image #M" collectively designate image data for the foveal image, where "Foveal Image #i" designates the image data for the i-th horizontal line of the foveal image, where i is an integer from one to M. Further, "Full Frame Image #1 to #M" collectively designate the image data for the full frame image, where "Full Frame Image #i" designates the image data of the i-th horizontal line of the full frame image.

In the illustrated embodiment, the coordinate data is embedded as pixel data of the image data for the full frame image. In other embodiments, the coordinate data may be embedded at a different location of the image data. In still other embodiments, the coordinate data may be transmitted to the display driver 100 separately from the image data.

Referring back to FIG. 3A, the interface circuitry 102 is further configured to forward the foveal image to the GRAM 104 and the full frame image to the GRAM 106. The interface circuitry 102 may be configured to process the foveal image and/or the full frame image and forward the processed foveal image and/or the full frame image to the GRAMs 104 and/or 106.

Figure 3B:
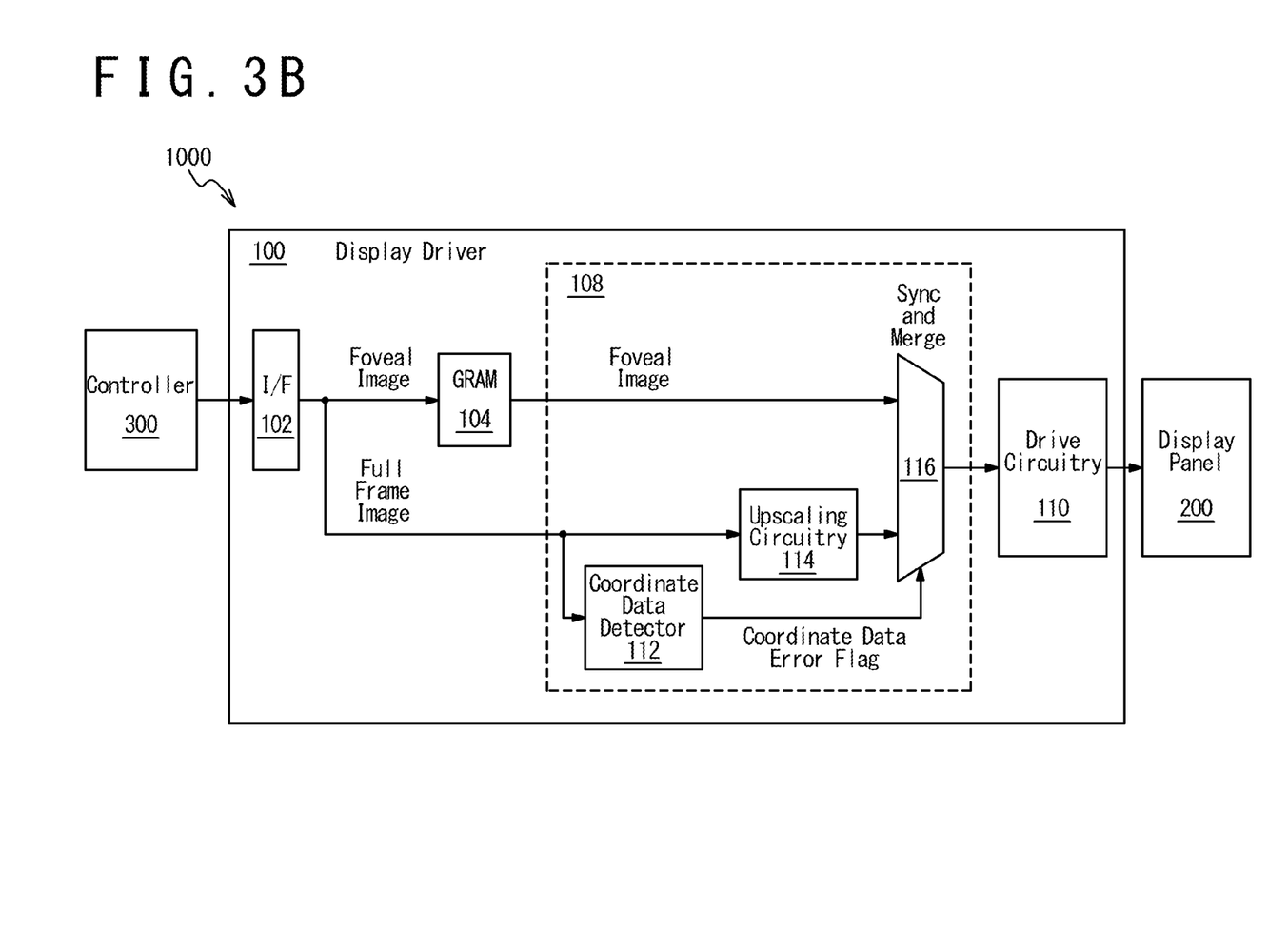
FIG. 3B illustrates an example configuration of a display driver, according to one or more embodiments.

The GRAM 104 is configured to store the foveal image received from the interface circuitry 102 and the GRAM 106 is configured to store the full frame image received from the interface circuitry 102. In other embodiments, as illustrated in FIG. 3B, the GRAM 106 may be omitted and the full foveal image is provided from the interface circuitry 102 to the image processing circuitry 108.

The image processing circuitry 108 is configured to render a resulting image based on the foveal image and the full frame image. In the illustrated embodiment, the image processing circuitry 108 includes a coordinate data detector 112, upscaling circuitry 114, and sync and merge circuitry 116.

The coordinate data detector 112 is configured to detect a data error within the coordinate data. In embodiments where the coordinate data is embedded as pixel data of the image data for the full frame image, the coordinate data detector 112 may be configured to extract the coordinate data from the image data for the full frame image and detect a data error within the extracted coordinate data. The data error detection of the coordinate data may be based on a cyclic redundancy check or other error detection technologies. In one implementation, the coordinate data detector 112 is configured to assert a coordinate data error flag in response to detection of a data error within the coordinate data and deassert the coordinate data error flag in response to no detection of a data error within the coordinate data.

The upscaling circuitry 114 is configured to upscale the full frame image and provide the upscaled full frame image to the sync and merge circuitry 116. In one implementation, the upscaled full frame image may be N times as large as the full frame image received from the controller 300, where N is an upscale factor more than one. The upscale factor N may be a natural number of two or more. In some implementations, the upscaled full frame image may include $N^2$ times as many pixels as the original full frame image.

The sync and merge circuitry 116 is configured to render a resulting image based on the foveal image and the upscaled full frame image. The rendering of the resulting image is responsive to detection of a data error within the coordinate data. In various embodiments, the sync and merge circuitry 116 may be configured to, in response to no detection of a data error within the coordinated data (e.g., in response to a deassertion of the coordinate data error flag), render the resulting image by merging the foveal image with the upscale full frame image such that the foveal image is positioned in the upscaled full frame image as specified by the coordinate data.

The sync and merge circuitry 116 may be further configured to, in response to a detection of a data error within the coordinated data (e.g., in response to an assertion of the coordinate data error flag), render the resulting image based on the upscaled full frame image independently of the foveal image. In one implementation, the sync and merge circuitry 116 may be configured to, in response to the detection of the data error within the coordinated data, output the upscaled full frame image as the resulting image without merging the foveal image with the upscaled full frame image. The omission of merging the foveal image with the upscaled full frame image in response to the detection of the data error within the coordinated data may effectively mitigate or avoid corruption of the resulting image displayed on the display panel 200.

The sync and merge circuitry 116 may be further configured to achieve synchronization between retrievals of the foveal image and the full-frame image from the GRAMs 104 and 106 based on the coordinate data. In one implementation, the sync and merge circuitry 116 may be configured to retrieve of the foveal image from the GRAM 104 at timing based on the coordinate data while successively retrieving the full-frame image from the GRAM 106. Retrieving the foveal image at the timing determined based on the coordinate data may allow the foveal image to be merged with the full-frame image at the position specified by the coordinate data.

The image processing circuitry 108 may be further configured to apply one or more other image process to the resulting image rendered by the sync and merge circuitry 116 and forward the image generated through the image processes to the drive circuitry 110. The image processes performed by the image processing circuitry 108 may include color adjustment, gamma transformation, overdriving, or other image processes.

The drive circuitry 110 is configured to drive the display panel 200 based on the resulting image rendered by the image processing circuitry 108. In some embodiments, the drive circuitry 110 is configured to drive the display panel 200 to display the resulting image on the display panel 200.

Figure 4B:
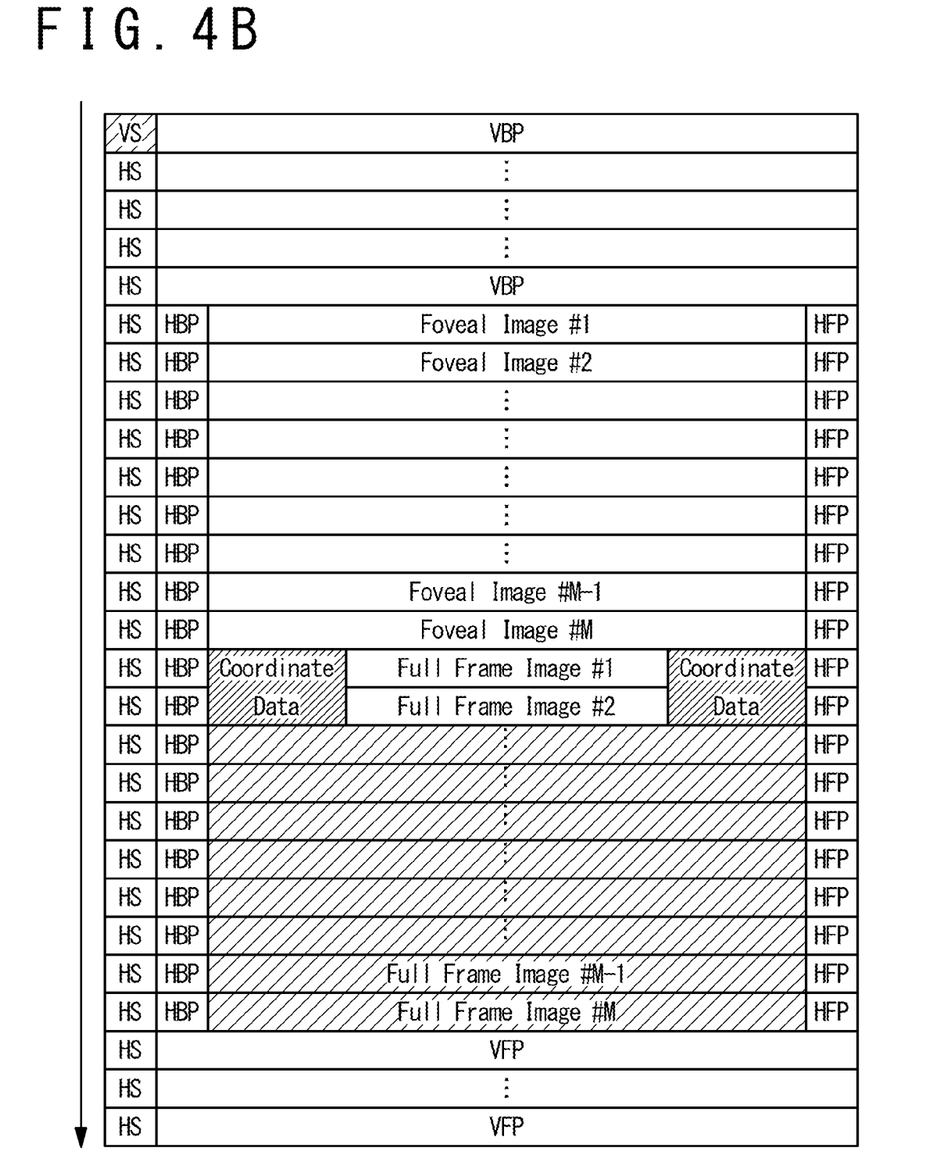
FIG. 4B illustrates another example data format of image data transmitted from a controller to a display driver during one frame period, according to one or more embodiments.

FIG. 4B illustrates another example data format of the image data transmitted from the controller 300 to the display driver 100 during one frame period, according to one or more embodiments. The coordinate data may include a plurality of data portions, whereby each data portion includes the same data that specifies the position of the foveal image. In the illustrated embodiment, the coordinate data include two data portions separately embedded in the image data for the full-frame image.

In embodiments where the coordinate data include a plurality of data portions each including the same data that specifies the position of the foveal image as illustrated in FIG. 4B, the image processing circuitry 108 may be configured to detect the data error based on inconsistency of the plurality of data portions. In one implementation, the image processing circuitry 108 may be configured to detect the data error when one of the plurality of data portions is different from another of the plurality of data portions. In one implementation, the coordinate data detector 112 may be configured to extract the data portions of the coordinate data from the image data for the full frame image and detect a data error within the coordinate data based on inconsistency of the data portions. In embodiments where the coordinate data include two data portions as illustrated in FIG. 4B, the coordinate data detector 112 may be configured to detect the data error when the two data portions are different from each other.

Figure 5:
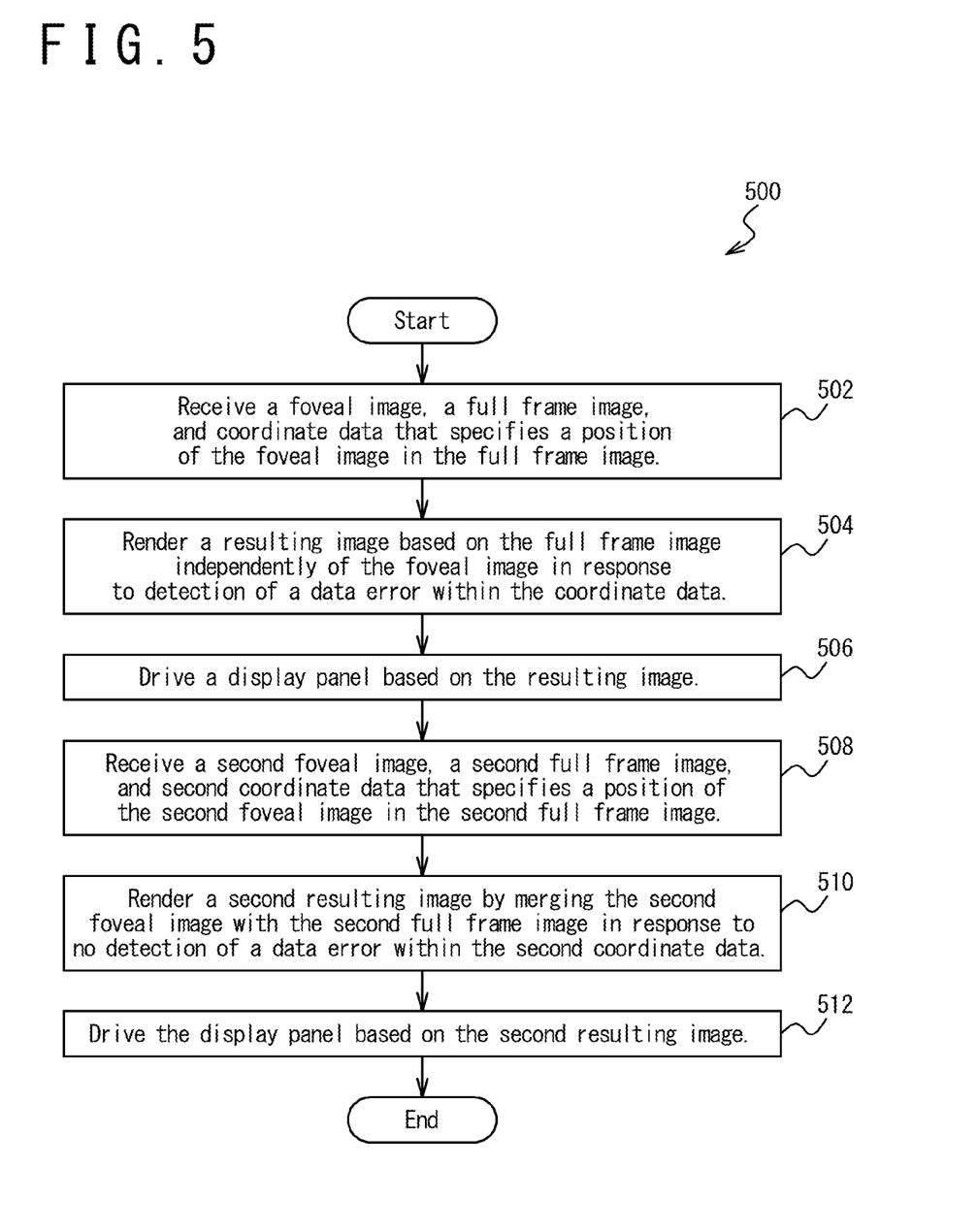
FIG. 5 illustrates an example method for foveated rendering, according to one or more embodiments.

Method 500 of FIG. 5 illustrates example steps for achieving foveated rendering, according to one or more embodiments. It is noted that one or more of the steps illustrated in FIG. 5 may be omitted, repeated, and/or performed in a different order than the order illustrated in FIG. 5. It is further noted that two or more steps may be implemented at the same time.

The method includes receiving a foveal image, a full frame image, and coordinate data that specifies a position of the foveal image in the full frame image at step 502. This is followed by rendering a resulting image based on the full frame image independently of the foveal image in response to detection of a data error within the coordinate data at step 504. The method further includes driving a display panel based on the resulting image at step 506. The method further includes receiving a second foveal image, a second full frame image, and second coordinate data that specifies a position of the second foveal image in the second full frame image at step 508. This is followed by rendering a second resulting image by merging the second foveal image with the second full frame image in response to no detection of a data error within the second coordinate data at step 510. The method further includes driving the display panel based on the second resulting image at step 512.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display driver, comprising:
   image processing circuitry configured to:
      receive a foveal image, a full frame image, and coordinate data that specifies a position of the foveal image in the full frame image; and
      render, after receiving the foveal image, the full frame image, and the coordinate data, a resulting image based on the full frame image independently of the foveal image in response to detection of a data error within the coordinate data, wherein rendering the resulting image based on the full frame image independently of the foveal image is performed without referring to the foveal image; and
   drive circuitry configured to drive a display panel based on the resulting image.

2. The display driver of claim 1,
   wherein the image processing circuitry is further configured to upscale the full frame image, and
   wherein rendering the resulting image based on the full frame image independently of the foveal image comprises outputting the upscaled full frame image as the resulting image in response to the detection of the data error within the coordinate data.

3. The display driver of claim 1, wherein the image processing circuitry is further configured to:
   receive a second foveal image, a second full frame image, and second coordinate data that specifies a position of the second foveal image in the second full frame image; and
   render a second resulting image by merging the second foveal image with the second full frame image in response to no detection of a data error within the second coordinate data, and
   wherein the drive circuitry is further configured to drive the display panel based on the second resulting image.

4. The display driver of claim 3,
   wherein the image processing circuitry is further configured to upscale the second full frame image, and
   wherein rendering the second resulting image further comprises merging the second foveal image with the upscaled second full frame image in response to no detection of the data error within the second coordinate data.

5. The display driver of claim 1,
   wherein the coordinate data is embedded as pixel data in the full frame image, and
   wherein the image processing circuitry is configured to extract the coordinate data from the full frame image.

6. The display driver of claim 1,
   wherein the coordinate data comprises a plurality of data portions each generated to comprise the same data that specifies the position of the foveal image, and
   wherein the image processing circuitry is configured to detect the data error based on inconsistency of the plurality of data portions.

7. The display driver of claim 1, further comprising a graphic random access memory configured to store the foveal image,
   wherein the image processing circuitry is configured to retrieve the foveal image from the graphic random access memory at timing based on the coordinate data.

8. A display system, comprising:
   a display panel; and
   a display driver configured to:
      receive a foveal image, a full frame image, and coordinate data that specifies a position of the foveal image in the full frame image,
      render, after receiving the foveal image, the full frame image, and the coordinate data, a resulting image based on the full frame image independently of the foveal image in response to detection of a data error within the coordinate data, wherein rendering the resulting image based on the full frame image independently of the foveal image is performed without referring to the foveal image, and drive the display panel based on the resulting image.

9. The display system of claim 8, wherein the display driver is further configured to upscale the full frame image, and wherein generating the resulting image based on the full frame image independently of the foveal image comprises outputting the upscaled full frame image as the resulting image in response to the data error being detected within the coordinate data.

10. The display system of claim 8, wherein the display driver is further configured to:

receive a second foveal image, a second full frame image, and second coordinate data that specifies a position of the second foveal image in the second full frame image;

render a second resulting image by merging the second foveal image with the second full frame image in response to no detection of a data error within the second coordinate data; and drive the display panel based on the second resulting image.

11. The display system of claim 10, wherein the display driver is further configured to upscale the second full frame image, and wherein rendering the second resulting image further comprises merging the second foveal image with the upscaled second full frame image in response to no data error being detected within the second coordinate data.

12. The display system of claim 8, wherein the coordinate data is embedded as pixel data in the full frame image, and wherein the display driver is configured to extract the coordinate data from the full frame image.

13. The display system of claim 8, wherein the coordinate data comprises a plurality of data portions each generated to comprise the same data that specifies the position of the foveal image, and wherein the display driver is configured to detect the data error based on inconsistency of the plurality of data portions.

14. The display system of claim 8, wherein the display driver further comprises a graphic memory configured to store the foveal image, and wherein the display driver is configured to retrieve the foveal image from the graphic memory at timing based on the coordinate data.

15. The display system of claim 8, wherein the display panel and the display driver are incorporated in a head mounted display (HMD).

16. A method, comprising:

receiving a foveal image, a full frame image, and coordinate data that specifies a position of the foveal image in the full frame image; and rendering, after receiving the foveal image, the full frame image, and the coordinate data, a resulting image based on the full frame image independently of the foveal image in response to detection of a data error within the coordinate data, wherein rendering the resulting image based on the full frame image independently of the foveal image is performed without referring to the foveal image; and driving a display panel based on the resulting image.

17. The method of claim 16, further comprising upscaling the full frame image, wherein rendering the resulting image based on the full frame image independently of the foveal image comprises outputting the upscaled full frame image as the resulting image in response to the detection of the data error within the coordinate data.

18. The method of claim 16, further comprising:

receiving a second foveal image, a second full frame image, and second coordinate data that specifies a position of the second foveal image in the second full frame image;

rendering a second resulting image by merging the second foveal image with the second full frame image in response to no detection of a data error within the second coordinate data; and driving the display panel based on the second resulting image.

19. The method of claim 18, further comprising upscaling the second full frame image, wherein rendering the second resulting image further comprises merging the second foveal image with the upscaled second full frame image in response to no detection of the data error within the second coordinate data.

20. The method of claim 16, further comprising:

extracting the coordinate data from the full frame image, wherein the coordinate data is embedded as pixel data in the full frame image.

* * * * *